United States Patent [19]

Husmann

[11] 3,986,676

[45] Oct. 19, 1976

[54] DEVICE FOR DISINTEGRATING MATERIAL SUCH AS PAPER

[76] Inventor: Gerhard Husmann, 4471 Niederlangen Nr. 5, Germany

[22] Filed: July 7, 1975

[21] Appl. No.: 593,911

[30] Foreign Application Priority Data

Jan. 11, 1975 Germany............................ 2500973
July 6, 1974 Germany............................ 2432603

[52] U.S. Cl.................................... 241/51; 241/56; 241/73
[51] Int. Cl.²......................................... B02C 18/12
[58] Field of Search .................. 241/49, 50, 51, 55, 241/56, 73, 74, 79, 79.2

[56] References Cited
UNITED STATES PATENTS

| | | | |
|---|---|---|---|
| 1,777,905 | 10/1930 | Van Gelder | 241/49 |
| 2,082,419 | 6/1937 | Rietz | 241/51 |
| 2,822,846 | 2/1958 | Ward | 241/74 |
| 3,756,517 | 9/1973 | Hoch et al. | 241/74 |

*Primary Examiner*—Granville Y. Custer, Jr.
*Attorney, Agent, or Firm*—Allison C. Collard

[57] ABSTRACT

A device for disintegrating material such as paper comprising a motor-driven disintegrating assembly disposed in the lower part of a feed chute, the disintegrating assembly having a plurality of knives fixed in mutually overlying relationship on a working shaft. The lower end of the feed chute is formed as a screening drum disposed coaxial to the working shaft and is surrounded by a paper discharge air duct, that portion of the working shaft located in the screening drum being provided with blower vanes and at least one additional knife.

6 Claims, 7 Drawing Figures

DEVICE FOR DISINTEGRATING MATERIAL SUCH AS PAPER

The present invention relates to a device for disintegrating material such as paper wherein a motor-driven disintegrating assembly is provided in the lower region of a feed chute.

Disintegrating devices of the aforementioned type are already known. Known devices are available in different sizes and with various output capacities. The paper to be disintegrated is torn or cut into shreds by knives. It is also known to cut the paper to be disintegrated into strips.

The higher capacity devices often do not disintegrate the fed paper finely enough, so that operational disturbances due to obstruction of the cutting assemblies often occur. In known devices, these disadvantages are avoided by considerable capital investment, which adversely influences manufacturing cost.

It is an object of the present invention to provide a device of the aforementioned type which disintegrates large quantities of paper in a relatively short time, while avoiding operational disturbances.

This object is attained according to the present invention in that the disintegrating assembly comprises several knives fixed in mutually overlying relationship on a working shaft, the lower end of the feed chute being in the form of a screening drum disposed coaxial to the working shaft and surrounded by a paper discharge air duct, and that portion of the working shaft located in the screening drum comprises blower vanes and at least one additional knife.

The disintegrating assembly ensures that the fed paper is disintegrated in stages in the manner that on being fed to the feed chute, it has to pass the coaxial mutually overlying knives. When the already predisintegrated paper has fallen through the cutting region of the lowest knife, it arrives in the screening drum and is aerated by the blower vanes and more finely disintegrated by the additional knife. The finely disintegrated aerated paper shreds are conveyed through the screen openings by the air current produced by the blower vanes and conveyed out of the device by the air current passing through the paper discharge air duct. The screening drum with the internally rotating knife has the advantage that the paper previously disintegrated by the mutually overlying knives remains in the screening drum until it has been disintegrated into small shreds able to pass through the screen openings in the screening drum without hindrance. Obstruction of the screening drum is impossible, since any adhering paper shreds are again dragged off at every other revolution of the blower vanes.

Advantageously, the device is so formed that one of the uppermost of the mutually overlying knives is in the form of agitating arms, one of the middle mutually overlying knifes is in the form of a disc with substantially radial slits and axially protruding cutting edges, and one of the lowermost of the mutually overlying knives is formed in a corresponding manner to the middle knife and has a diameter which is at least equal to the internal radius of the screening drum. The agitating arms of the uppermost knife induce a first tearing of the paper, which is then regularly shredded in the subsequent knives. As the lower knife has a diameter which is at least equal to the internal radius of the screening drum, only those paper shreds can enter the screening drum which have already passed by the lower knife, therefore ensuring that the paper fed to the feed chute passes through the working region of every knife and is disintegrated to a desired level.

The height of the blower vanes in the screening drum corresponds approximately to the interior height of the screening drum, with the advantage that any pieces of paper adhering to the screen openings in the screening drum on account of the blower air are again dragged off and are further disintegrated, until they are able to pass through the screen openings. The blower vanes are preferably in the form of rectangular sheet metal strips projecting radially from the working shaft and of a width substantially corresponding to the interior height of the screening drum. These sheet metal strips are fixed to the working shaft and are mutually offset by 180°. Knives are likewise disposed on the working shaft, and offset by 90° to the sheet metal strips so that they sweep the floor area of the screening drum with their cutting edges. By means of these knives rotating with the blower vanes, the paper shreds which fall into the screening drum are finely disintegrated until they are able to pass through the screen openings of the screening drum.

The screening drum is advantageously surrounded by an air duct which conveys the air stream, produced by the blower vanes, together with the entrained paper shreds, to a holding ring fixed on the outside of the device. The paper shreds separated from the air stream emerge from the air duct in this holding ring. The paper shreds fall into a paper shred collection sack to be fixed to the holding ring. The collection sack is fixed to the lower periphery of the holding ring. A filter bag similar to a filter bag of a vacuum cleaner is fixed to the upper periphery of the holding ring. The air flows out through this filter bag. The paper shreds, however, are held back and fall downwards into the collection sack.

The floor of the screening drum may also be constructed in the form of a disc projecting radially from and rotating with the working shaft, and to extend through the zone enclosed by the screening drum and into the paper discharge air duct, and on which there is disposed at least one knife vane which sweeps over the outer shell of the screening drum and at least partly fills the free space of the air duct. By this means, the paper discharge air duct is continuously cleared, if any disintegrated paper in shredded form settles therein. The knife vanes sweep the outer shell of the screening drum with their cutting edge, whereby a drawcut is made on the paper passing through the screen apertures by the rotation of the knife vanes due to the required clearance between the screening drum and the cutting edge of the knife vanes, so that the passing plugs of paper are in practice dragged through the screening drum wall before further disintegration takes place. This also guarantees that the openings in the screening drum cannot become clogged. Moreover, as the knife vanes are so disposed on the disc that they at least partly fill the free space of the air duct, they are similar in their action to known blower vanes, which produce in the air duct a relatively strong air stream by which the paper is thrown out of the device. Operational disturbances due to clogging of the device are no longer possible in practice.

Other objects and features of the present invention will become apparent from the following detailed description when taken in connection with the accompanying drawings which disclose the embodiments of the invention. It is to be understood, however, that the drawings are designed for the purpose of illustration only and are not intended as a definition of the invention.

In the drawings, wherein similar reference characters denote similar elements throughout the several views.

Figure 1:
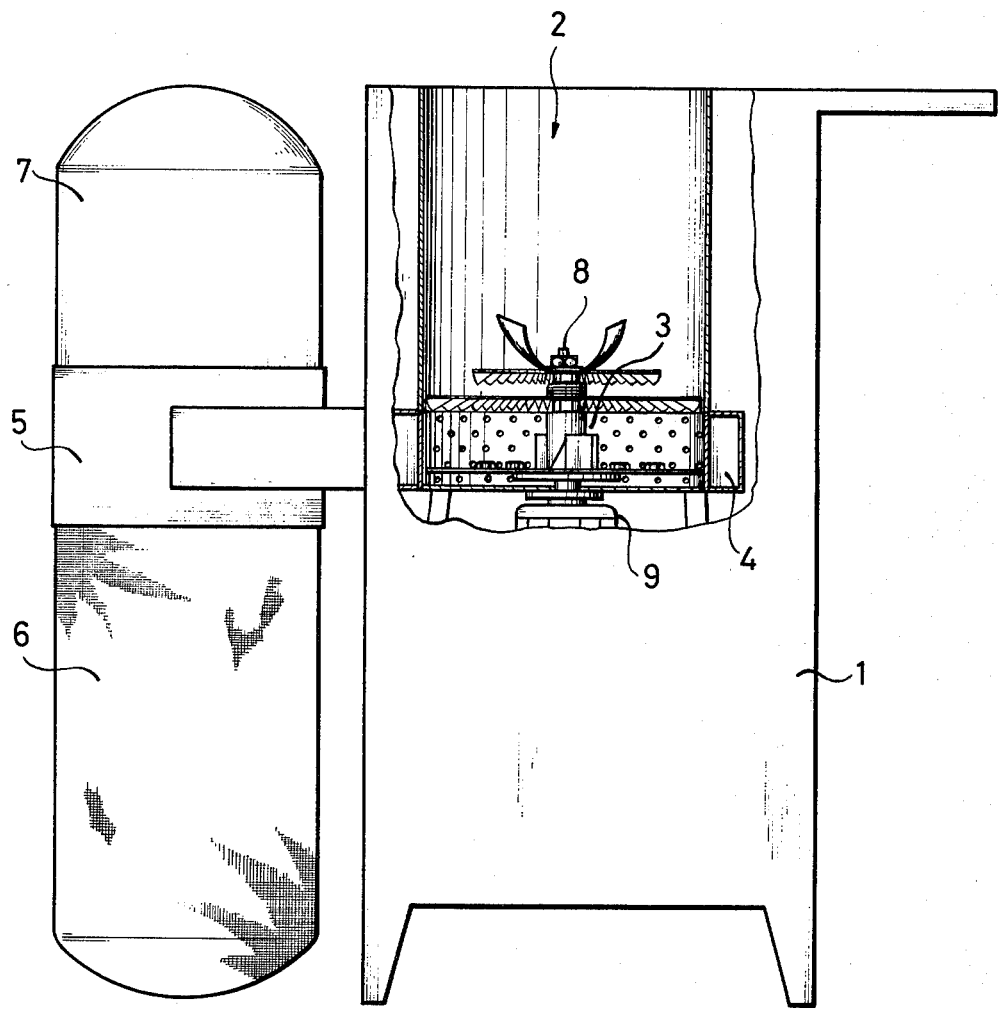
FIG. 1 is a diagrammatic side view of the device of the invention with the outer wall broken away in the filling region.

Referring now to the drawings, as shown in FIG. 1, the device for disintegrating paper comprises an upright rectangular housing 1, in which a filling chute 2 is incorporated which is accessible from the top of the housing. The disintegrating assembly is disposed in the lower part of the filling chute 2, its screening drum 3 being surrounded by an air duct 4 which discharges into a holding ring 5 disposed outside the housing 1. To the lower part thereof, a shredded paper collection bag 6 is fixed and to the upper part thereof, an air filter 7 is fixed. The floor of the filling chute 2 and the screening drum 3 are traversed by a centrally disposed vertical working shaft 8, on which paper disintegrating elements are disposed in the region of the screening drum and filling chute floor, and of which the end projecting from the screening drum floor is connected to an electric motor 9.

Figure 2:
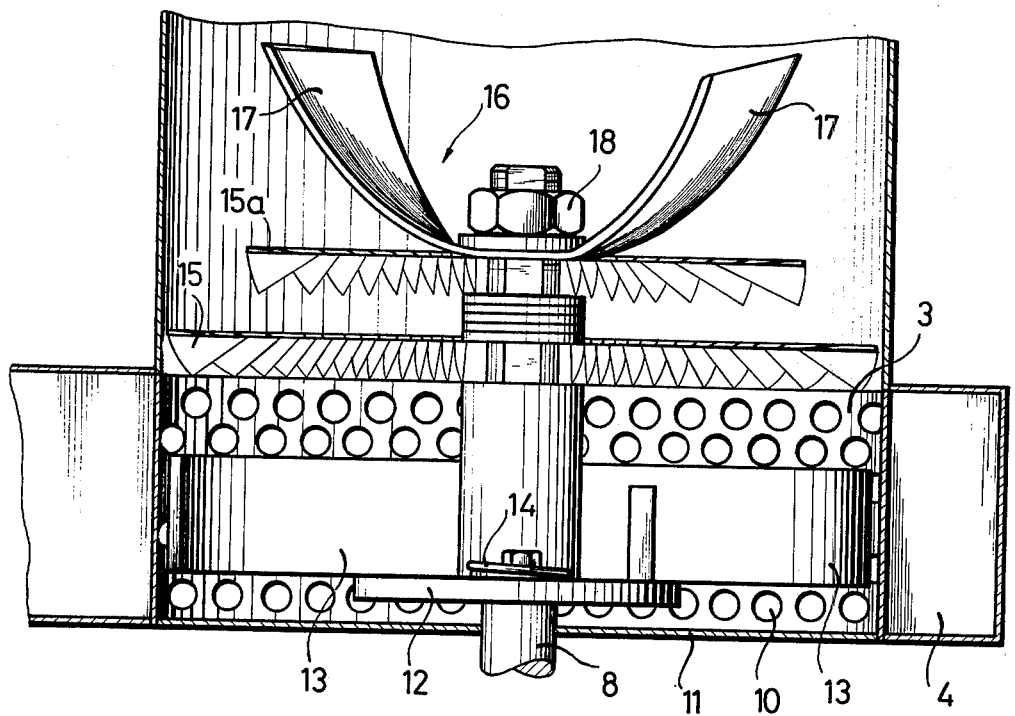
FIG. 2 is an enlarged diagrammatic side view of the disintegrating assembly according to FIG. 1.

FIG. 2 is a side view of the screening drum 3 showing the working shaft 8 in section. The screening drum 3 is cylindrical, and the surface shell is provided with a plurality of screen openings 10. The screening drum is closed at its lower part by a screening drum floor 11. The working shaft 8 traverses the screening drum floor. On the working shaft, there is fixed a radially extending disc 12 which serves as a support and base for radially extending blower vanes 13 and radially extending knives 14. The screening drum 3 is closed at its upper part by a knife disc 15, likewise fixed on the working shaft 8, and whose diameter, as illustrated, corresponds to the inner diameter of the stationary screening drum 3. A second knife disc 15a is fixed on the working shaft 8 at a predetermined distance above the knife disc 15. A vane knife 16 is disposed above the knife disc 15a as illustrated. The vane knife consists of two opposing agitating arms 17 projecting substantially radially from the working shaft. The two knife discs 15 and 15a and the vane knife 16 are fixed on the working shaft 8 by a nut and screw coupling 18.

Figure 3:
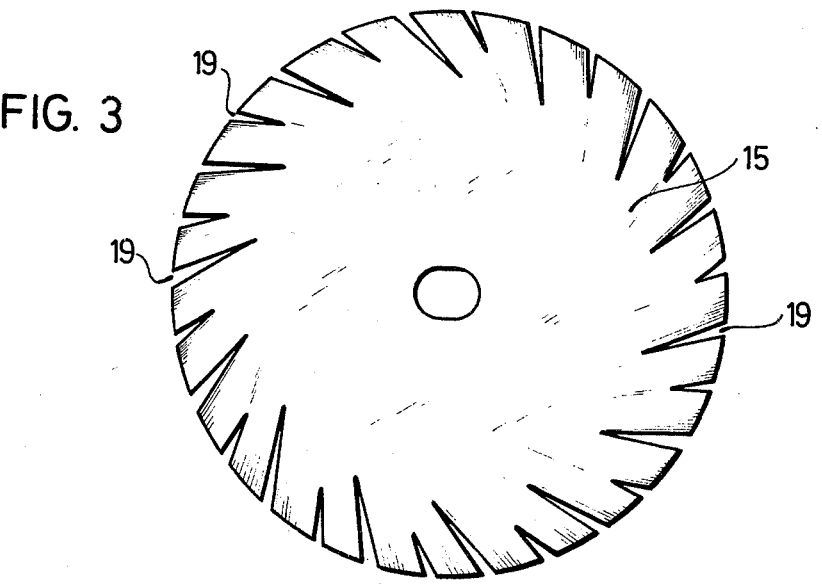
FIG. 3 is a plan view of one of the mutually overlying disc-shaped knives.

FIG. 3 is a plan view of the knife disc 15. The knife disc 15a is of similar form. Each knife disc is provided with slits 19 projecting substantially radially from the knife disc periphery. One of the knife disc edges bordering the slits is bent upwardly to form a cutting edge protruding from the plane of the disc.

Figure 4:
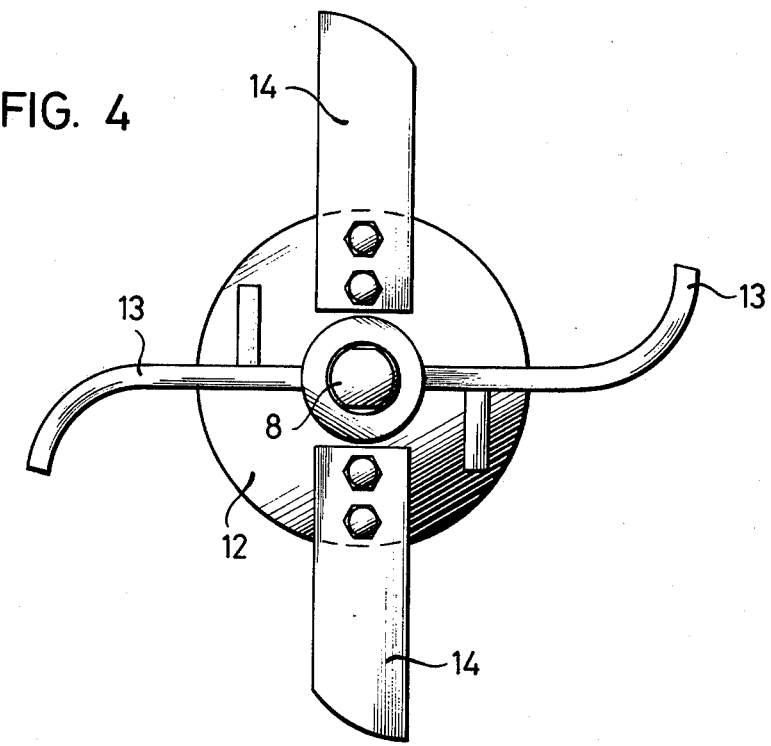
FIG. 4 is a plan view of the parts which rotate in the screening drum of FIG. 2.

FIG. 4 is a plan view of that part of the working shaft 8 disposed in the screening drum 3. On the working shaft is fixed the disc 12 which supports the blower vanes 13 and the radially extending knives 14. The knives 14 are fixed to the disc 12 by screws, in order to allow them to be easily replaced.

Figure 5:
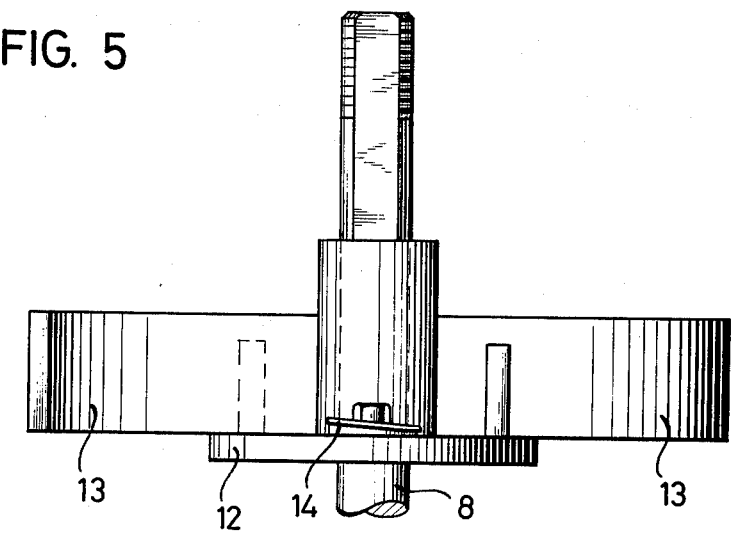
FIG. 5 is a side view of the part illustrated in FIG. 4.

FIG. 5 is a diagrammatic side view of that shown in FIG. 4. As already indicated in FIG. 2, the blower vanes 13 are in the form of sheet metal strips standing upright on the disc 12, and extending radially from the working shaft 8 and mutually offset by 180°. Radially extending knives 14 are fixed on the disc 12, offset at 90° to the blower vanes 13.

Figure 6:
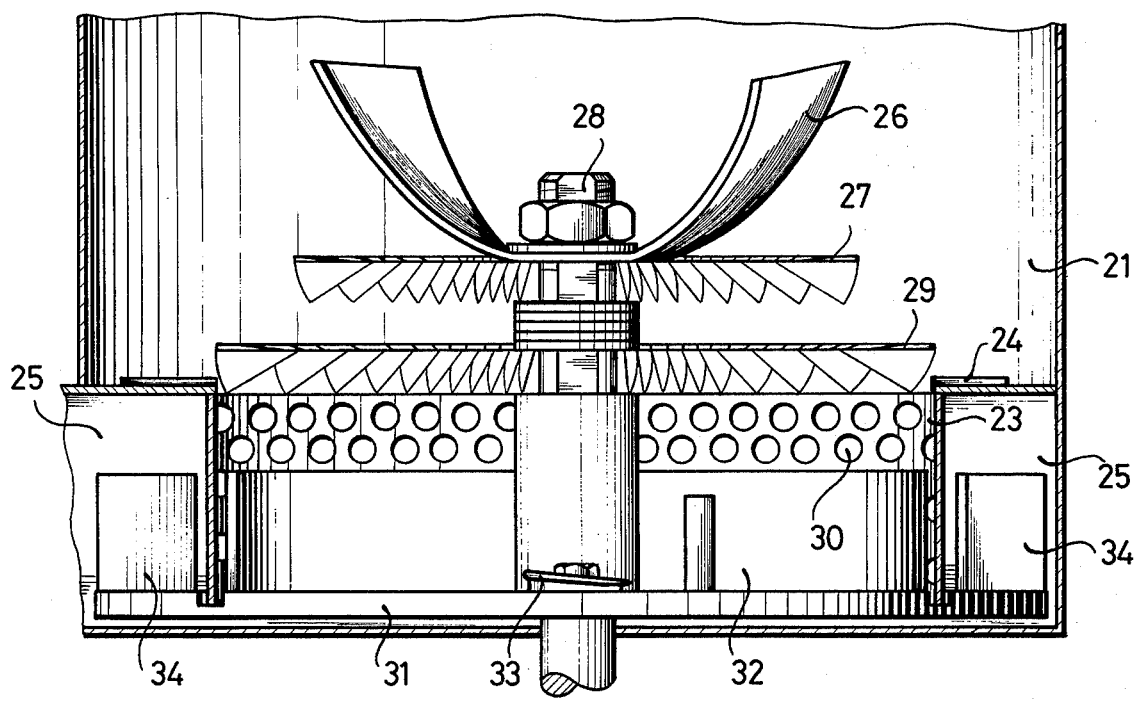
FIG. 6 is a diagrammatic side view of the lower end of the filling chute of a further embodiment of the device for disintegrating paper.

In FIG. 6, the disintegrating assembly is disposed in the lower part of a filling chute 21, the screening drum 23 and working shaft 28 being shown in section in this side view. The screening drum 23 is cylindrical and its surface shell comprises a plurality of screen openings 30. The screening drum is fixed to the upper cover plate of the paper discharge air duct 25 by lateral lugs 24, as illustrated, so that it is practically suspended. Vane knife 26 and Knife discs 27 and 29 for disintegrating the paper thrown into the filling chute 21 are fixed on the working shaft 28. On the working shaft 28, there is also disposed a radially extending disc 31 which forms the floor of the screening drum. Blower vanes 32 and knives 33 are disposed on the disc 31 within the zone embraced by the screening drum. The disc 31 is of larger diameter than the screening drum 23, and thus projects into the lateral radially encircling paper discharge air duct. That area of the disc which projects into the paper discharge air duct is provided, as shown, with knife vanes 34 extending upright from the disc and partly filling the paper discharge air duct. In order to obtain satisfactory sealing, the side walls of the screening drum 23, which is stationary in the region of the filling chute floor, are inserted into a circumferential groove in the disc 31, it being of course ensured that there is no abrasion between the base of the groove and the screening drum wall when the device operates.

Figure 7:
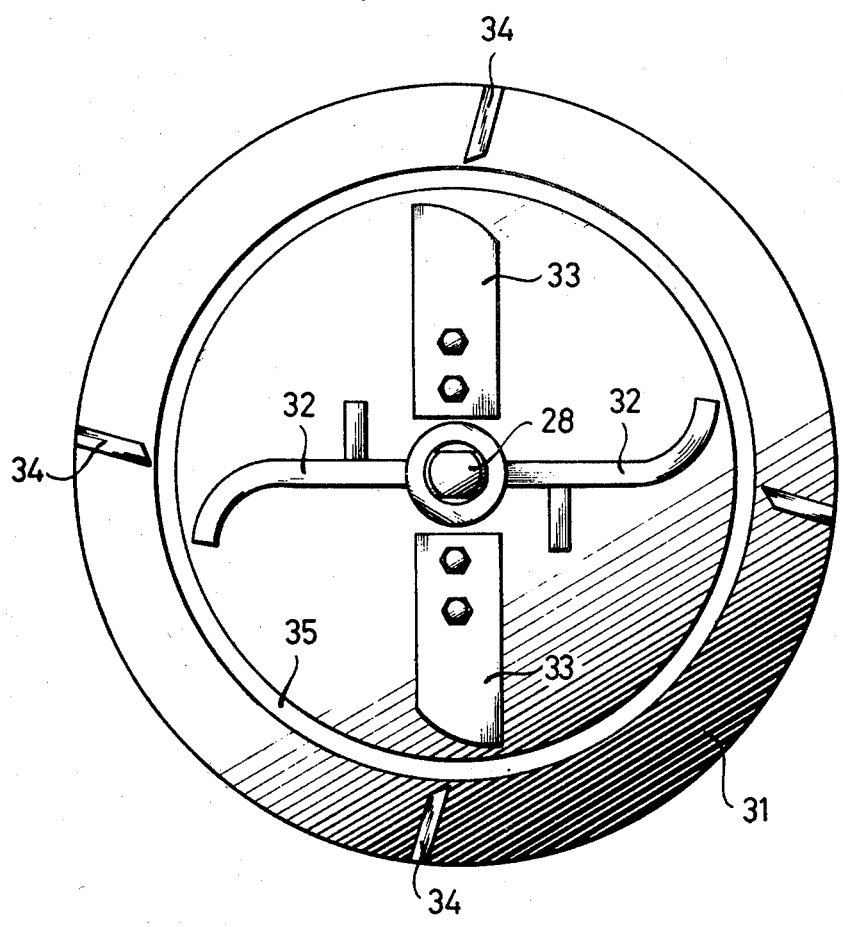
FIG. 7 is a plan view of the disc according to the invention forming the floor of the screening drum.

FIG. 7 is a plan view of the disc 31 with the recessed groove 35 into which the screening drum wall can penetrate. These components are provided with the same reference numbers as in FIG. 6.

While only a few embodiments of the present invention have been shown and described, it will be apparent to those skilled in the art that many changes and modifications may be made thereunto without departing from the spirit and scope of the invention.

What is claimed is:

1. A device for disintegrating material such as paper, comprising:
    a feed chute;
    a motor-driven disintegrating assembly disposed in a lower part of said feed chute, said disintegrating assembly including a working shaft and a plurality of knives fixed in mutually overlying relationship on said working shaft, said lower end of said feed chute being in the form of a screening drum disposed coaxial to said working shaft; and
    a paper discharge air duct surrounding said screening drum, said working shaft having a portion located in said screening drum, and blower vanes and at least one additional knife disposed on said portion of said working shaft.

2. The device as recited in claim 1, wherein said plurality of overlying knives includes an uppermost knife in the form of agitating arms, an intermediate knife being of disc form with substantially radial slits and axially protruding cutting edges, and a lowermost knife of similar form to said intermediate knife and having a diameter which corresponds to an inner diameter of said screening drum.

3. The device as recited in claim 1, wherein the height of said blower vanes is approximately equal to an interior height of said screening drum.

4. The device as recited in claim 1, wherein said screening drum has a floor and said at least one of said additional knife rotating in said screening drum and in a cutting plane which is substantially parallel to said floor of said screening drum.

5. The device as recited in claim 1 further comprising a holding ring operatively connected to said air duct, the latter discharging into said holding ring, a shredded paper collection bag being attached to a lower part of said holding ring, and an air filter bag attached to said ring.

6. The device as recited in claim 1, wherein said screening drum has a floor in the form of a disc projecting radially from said rotating with said working shaft, and extending through a zone enclosed by said screening drum and into said paper discharge air duct, at least one knife vane means on said disc for sweeping the outer surface of said screening drum and at least partly filling the free space in said air duct.

* * * * *